United States Patent [19]

Barnett

[11] 4,058,005
[45] Nov. 15, 1977

[54] IMPROVEMENTS IN OR RELATING TO STRAIN TRANSDUCERS

[76] Inventor: John David Barnett, 12 Craig Drive, Whaley Bridge, Stockport, Cheshire, England

[21] Appl. No.: 721,592

[22] Filed: Sept. 8, 1976

[51] Int. Cl.$^2$ .............................................. G01B 7/18
[52] U.S. Cl. .............................. 73/88.5 R; 33/147 D; 338/6
[58] Field of Search .................. 73/88.5 R; 33/147 D, 33/148 D, DIG. 13; 338/6

[56] References Cited

U.S. PATENT DOCUMENTS 3,158,939  12/1964  Brooks, Jr. .................. 73/88.5 R X
3,608,365   9/1971  Baucom et al. .................. 73/88.5 R

FOREIGN PATENT DOCUMENTS 741,093  11/1955  United Kingdom ............. 33/147 D Primary Examiner—Charles A. Ruehl
Attorney, Agent, or Firm—Cushman, Darby & Cushman

[57] ABSTRACT

Strain measurement apparatus comprises a rigid support arranged to be secured against the surface of a structure. One or more resiliently deformable carrier elements provided with strain gauges mounted in said support are urged against the surface by the securing of the support to engage the surface at regions spaced from the region of securing of the support and thereby the strains at said regions of engagement are translated directly into deformation of the carrier element or elements to produce measurement signals from the strain gauges. The engagement pressure is transmitted to the elements through resilient means that limit its magnitude while allowing the apparatus to be firmly secured to the surface.

8 Claims, 5 Drawing Figures

IMPROVEMENTS IN OR RELATING TO STRAIN TRANSDUCERS

BACKGROUND OF THE INVENTION

This invention relates to the measurement of strain in structures by the use of electrical strain gauges.

It is usual to mount a series of such gauges on a support that is in its turn mounted on the structure the strains in which are to be measured. This in particular facilitates the measurement process because it is possible to so arrange the gauges that various sources of error, in particular zero errors, are cancelled out, but even if a single gauge is employed it may be preferred to mount it on a support in order to attach it more conveniently to the structure or to provide it in an enclosure that will protect it against dirt and damage, or to provide a magnification of the structure strain.

The gauge is therefore not directly in contact with the structure that is to be monitored and problems can arise in ensuring that strains in the structure are correspondingly reflected in the gauge or gauges, or of providing a unit that can be mounted on the structure without requiring a great deal of effort or skill. The problem is made more difficult by the fact that it is usually necessary to ensure that the unit is secured very firmly to the structure, and yet it must be able to allow the strain gauge or gauges to respond freely to strains of the structure.

For example, in U.S. Pat. No. 2,316,075, there is described a unit comprising an arch-form beam, the legs of which engage the surface to be monitored and strain gauges on the upper and lower edges of the arch are respectively compressed and extended if the surface between the legs of the unit is extended, the gauges being connected into a bridge circuit to evaluate the strains occurring in the structure. Such an arrangement gives a direct response to strains in the structure but it is impossible to exert such pressure on the legs as would hold them firmly in place if, for example, the structure was moving. It is therefore more suited to carefully controllable laboratory conditions than to general industrial application.

UK Patent 1,335,520 is an example of a unit which can be firmly secured in placed and which is moreover adapted to be fully enclosed so that it can be used in instances where dirt or moisture create a problem and it can be mounted securely on a moving structure, such as an axle or wheel support of a vehicle. The unit comprises spaced end blocks interconnected by an integral but flexible carrier element on which the gauges themselves are mounted, the end blocks being provided with means to secure them to the structure to make them each completely fixed with respect to the adjacent region of the structure, so that the carrier element will then deform with movements of the structure.

In such an arrangement, preparation of the surface to receive the unit is more complicated since it is now necessary for two spaced regions of the surface to be made co-planar if the unit is to be secured in place without initial deformation. Also, the gauges are able to produce signals that are only indirectly related to the extension and contraction of the structure surface between the end blocks and they may be influenced by extraneous movements such as twisting of the structure. Because the end blocks are positively fixed to the structure, all of the surface will be transmitted to the gauges, but this can be a disadvantage if the installation is susceptible to overload, e.g. through transient dynamic loading, and damage may then be caused to the gauges or their measuring circuit.

SUMMARY OF THE INVENTION

According to the present invention, there is provided strain measurement apparatus comprising at least one strain gauge and arranged to be engaged with a plurality of spaced regions of a surface to obtain signals from said gauge in response to strains in the surface between said regions, said at least one gauge being mounted on at least one resiliently deformable carrier element projecting from a rigid support to engage the surface, said support being provided with means for securing or permitting securing the apparatus to the surface at a further region spaced from the region of engagement of the or each said carrier element with the surface.

In this way, the fixing of the apparatus to the surface is obtained at a region different from an engagement region from which a strain measurement is derived and a secure fixing can be made while still ensuring that the signals produced by the strain gauge or gauges are directly related to the contraction and expansion of the surface, being determined solely by the mode of resilience of the carrier element. Preferably, this effect is best obtained by having a plurality of carrier elements at spaced regions arranged preferably symmetrically with respect to securing means between them.

It is also possible by the use of the invention to arrange that the securing means act through resilient means to apply the or each carrier element to the surface whereby said resilient means act as a buffer limiting the pressure with which the or each carrier element engages the surface. This has the result that the apparatus can be firmly fixed in place without any risk of overstressing a carrier element or causing malfunction of its gauge or gauges, and it is therefore possible to provide a robust installation capable of resisting damage or dislodgement.

It is possible for the carrier element engagement pressure to be applied by means other than the apparatus securing means to obtain these advantages, but by utilizing said securing means there is the further advantage that the mounting of the apparatus can be made by a single member. This in turn can simplify mounting of the apparatus in requiring preparation of a smaller surface area, or even of being able to use an unprepared surface.

In a preferred form of the invention, means are provided to limit the loading applied to the carrier element or elements and thus the mounting of the apparatus can be carried out by unskilled labour without risk of overloading a carrier element and ensuring that the element engages the surface with an optimum pressure. Such an arrangement is especially advantageous if the loading is applied by the apparatus securing means.

Preferably, apparatus according to the invention comprises an enclosure for protection against dirt and moisture. In a convenient arrangement, the enclosure forms part of the means by which the apparatus is mounted in position and the or each carrier element projects from the enclosure to engage the surface being monitored, but for protection of the projecting part or parts external sealing means are provided to co-operate with the surface on which the apparatus is mounted.

BRIEF DESCRIPTION OF THE DRAWINGS

The invention will be more particularly described with reference to the accompanying drawings, wherein.

DESCRIPTION OF THE PREFERRED EMBODIMENTS

Figure 1:
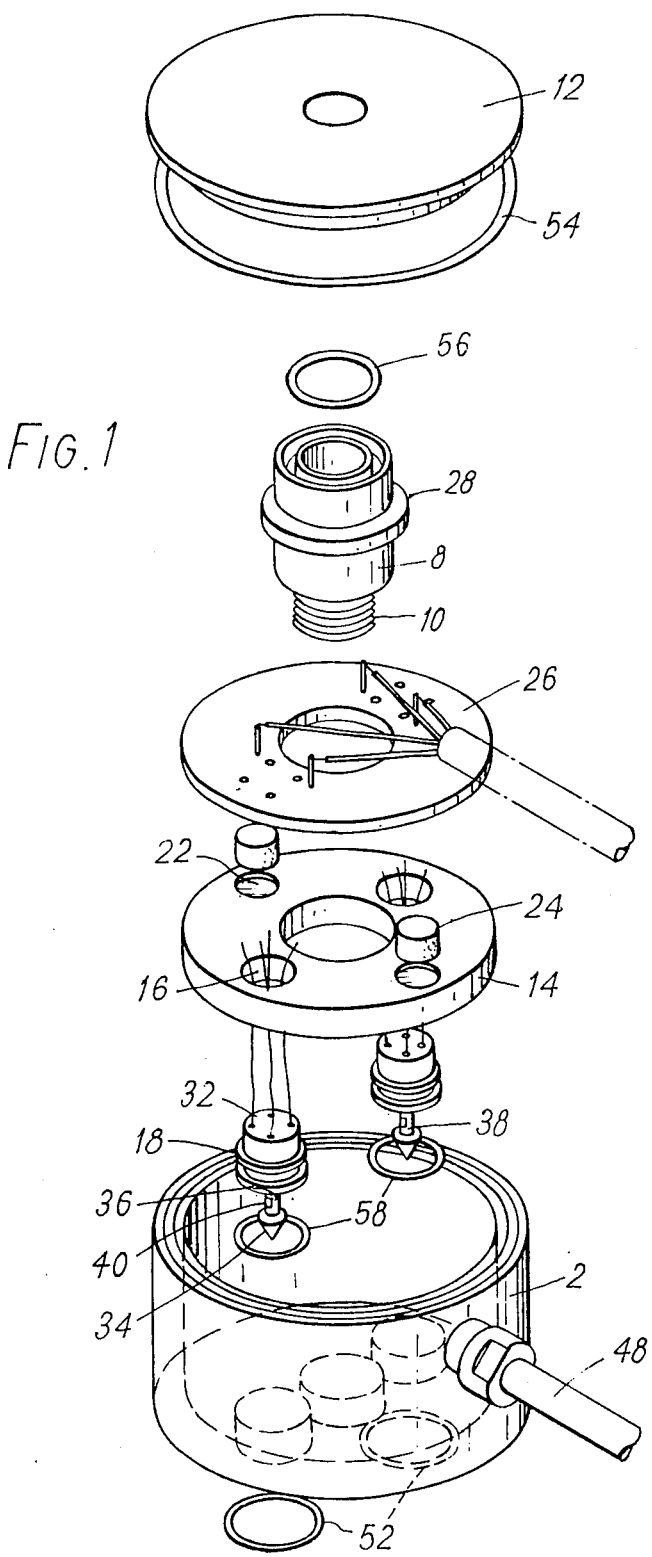
FIG. 1 is an exploded view of one form of strain measurement apparatus according to the invention.
Figure 2:
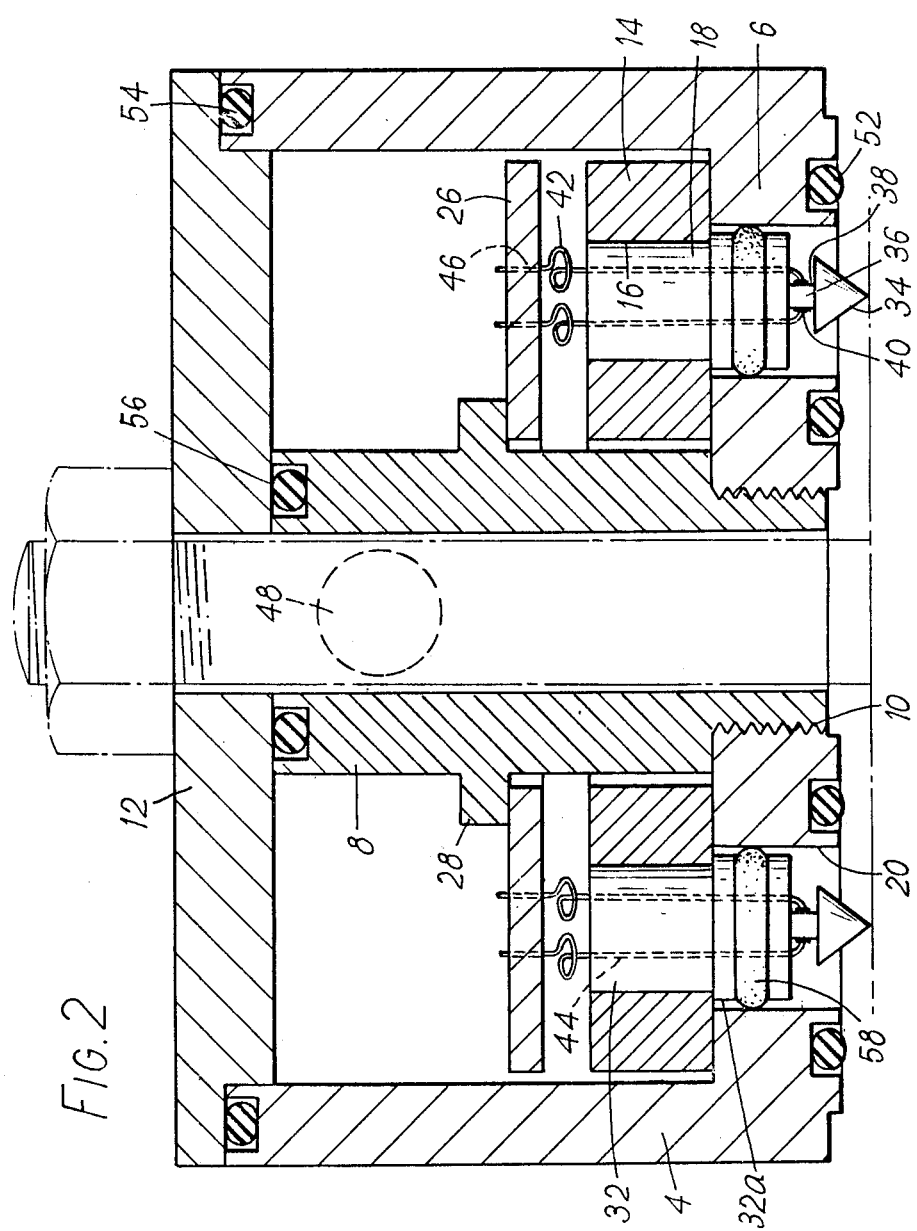
FIG. 2 is an axial sectional view of part of the apparatus of FIG. 1, to a larger scale.

Referring more particularly to FIGS. 1 and 2 of the drawings, the apparatus comprises a generally circular housing 2 that includes an outer housing member with a cylindrical outer wall 4 and an annular bottom wall 6, an inner sleeve 8 having a screw-threaded connection 10 with the bottom wall 6 of the outer housing member, and an annular top cover plate 12 that seats on the outer housing member and the sleeve.

Within the housing 2 there is a rigid annular support plate 14 having diametrically opposite bores 16 in which respective carrier elements 18 are held parallel to the central axis of the housing to project through corresponding bores 20 in the housing bottom wall 6. On the upper face of the plate 14 there are also a pair of diametrically opposite recesses 22, arranged symmetrically with respect to the bores 16. Resilient pressure pads 24, e.g. of silicone rubber, are located in the recesses but project above the surface of the support plate 14 and are compressed between the plate 14 and a bearer plate 26 which is urged downwards by a collar 28 on the sleeve 8 when the sleeve is screwed into the housing bottom wall 6. It is alternatively possible for the collar to have integral bearer means for the pads 24.

Each carrier element 18 comprises a cylindrical body 32 that is slidably located in the support plate bore 16 and a shoulder 32a of the body engages the support plate 14 so that the downward force of the pads 24 is transmitted to the carrier element. At the lower end of the element there is a hardened conical tip 34 spaced from the main body by a reduced section portion 36 that has opposed planar faces 38 normal to the diameter of the housing through the centres of the bores 16. On these faces are arranged respective resistance strain gauges 40, the wiring 42 from which extends through respective bores 44, 46 in the element body and the bearer plate and through a conduit 48 to suitable instrumentation and a power source disposed externally. The bearer plate may provide a printed circuit layout for convenience of connecting the gauge leads to the external wiring.

Figure 3:
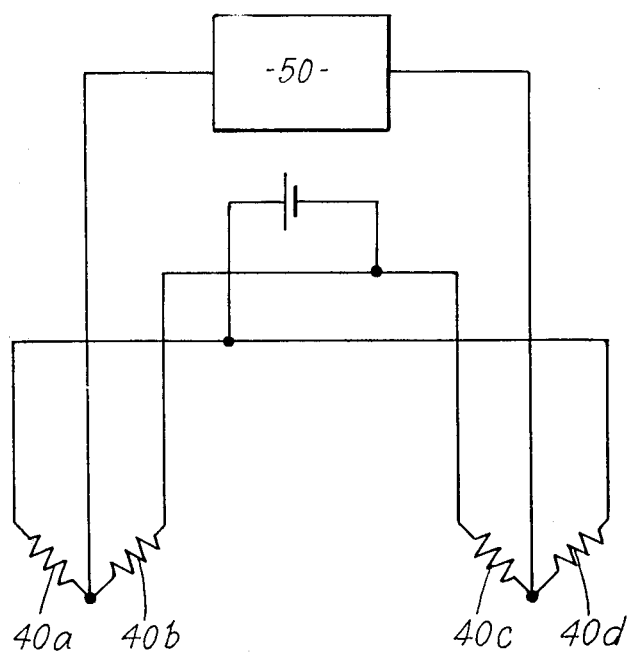
FIG. 3 is a diagrammatic illustration of the electrical circuit for the apparatus of FIGS. 1 and 2, and, FIGS. 4 and 5 are schematic illustrations of further forms of strain measurement apparatus according to the invention.

The arrangement of the apparatus is such that radial movements of the body 32 of each element with respect to the housing are prevented by the rigid support plate 14 and if the conical tips of the two elements are engaged by the surface of a structure, the expansion and contraction of the surface between the tips flexes the reduced-section portions 36 of the elements and thus induces resistance changes in the strain gauges in known manner to produce signals that are a function of the strain of the surface. As FIG. 3 shows, the gauges can be interconnected in the form of a bridge, in this figure the gauges 40a, 40b representing the gauges on one element and the gauges 40c, 40d those on the other element. The processing apparatus 50 receiving the signals from the strain gauges can take any suitable form for the particular application of the apparatus, e.g. providing a meter reading and/or a permanent record of the strains of the surface being measured.

In use, the transducer can be secured to the surface to be measured by means of a single stud or bolt 64. For example a stud can be fixed to the surface by stud-welding and the apparatus positioned on it so that the stud extends through the sleeve 8 and a nut 66 can be threaded onto the stud and tightened down against the cover plate 12. This forces the housing against the surface and also, because of the engagement of the collar with the bearer plate, the carrier elements are urged downwards by the force applied from the bearer plate through the resilient pads and the support plate and their pointed tips indent the surface and are retained in the indents. It is however possible to use other securing means, e.g. the casing 2 can be welded to the surface.

It is to be noted that whichever method of securing is used, the indenting pressure is substantially independent of the securing force applied since the force is transmitted to rigid housing, e.g. the sleeve 8, and the indenting pressure is applied by the bearer plate through the compliant resistance of the resilient pads 24 which limit the force applied to the elements. It is therefore possible to have a robust and securely fixed apparatus in which the elements carrying the resistance strain gauges are nevertheless very lightly loaded, e.g. there being an indenting pressure or axial pressure on the elements of the order of 2kg. In particular flexure of the reduced portions on which the strain gauges are mounted is completed unaffected by the securing pressure applied to the housing. It may also be noted that it is relatively simple to change the indenting pressure, e.g. if this is required to cater for different types of surface, by using different resilient pads.

A further advantage of the illustrated arrangement is the ease with which the carrier elements, their gauges and associated wiring can be sealed from the exterior. For this purpose the bottom wall 6 may carry O-rings 52 surrounding the bores 20 and the carrier elements and further O-ring seals 54, 56 can be provided between the cover plate 12 and the housing outer wall 4 and sleeve 8 respectively. Each element may carry a further O-ring 58 sealing with the bore 20 and so providing a secondary seal backing the sealing ring 52 and providing further protection for the wiring from the gauges. In addition, the interior spaces of the housing may be filled with an encapsulating material. For trouble-free operation the strain gauges themselves can be glass-encapsulated film gauges, and the bearer member may be formed by a printed circuit board for the circuit to which the gauges are connected, with only low impedance wiring running externally of the casing.

The ability to secure the apparatus with a single-point fixing considerably facilitates its use. Thus, preparation of the surface is simplified and if it can be ensured that the resilient loading of the carrier elements allow them to align themselves it may be possible to mount the apparatus without any preparation at any of the areas in which the indents are made since the tips of the elements plastically deform the surface and therefore make their own contact bearings. The direct axial loading of the carrier elements ensures that the contact area will not change as the points force themselves into the surface and when in place the engaged tips are the only members of the apparatus constrained to move with strains of the surface so that there is a measurement of true surface strain given.

A further advantage found, that may be particularly useful when the transducer is required to work in arduous conditions, is that the light loading of the carrier elements allows their tips to leave the indents if excessively large overloads cause large strain movements of the surface, the tips reseating themselves in the indents when the overload is removed. It is found that this operates as an overload relief mechanism on the strain measurement circuit, preventing damage that might otherwise be caused by transient overloads.

While the transducer described can clearly be used in many widely different applications, all the features referred to above have particular advantages in load monitoring arrangements, such as are often required for the axles or wheel mounting of commercial vehicles. Such apparatus is normally installed by the user rather than the original manufacturer and there is often difficulty in preparing an axle surface adequately if the transducer to be used requires a large planar area to seat upon and is to be secured at multiple fixing points. It is also desirable in such applications to ensure that the transducers have adequate long-term protection against damp and dirt and to ensure that they are sufficiently robust to withstand damage in an exposed position without sacrificing sensitivity of measurement. These requirements are amply satisfied by the illustrated construction in which the security and sealing of the housing can be adequately ensured without influencing the location of the strain gauge carrier elements, even though the complete connection is able to be made by a single bolt or stud.

The ability to protect against transient overload is also of importance in vehicle load measuring arrangements since the transient loads that may be imposed on the axles of a moving vehicle can easily be many times greater than the static loading.

It will be further appreciated that the configuration shown in FIGS. 1 and 2 is simply one example within the scope of the invention. Thus, instead of the circular plan form of the housing, it would be possible to give the tranducer an elongate form with a relatively narrow support member acting as a bridge between the two spaced strain gauged carrier elements, if, for example, this is dictated by space requirements.

Figure 4:
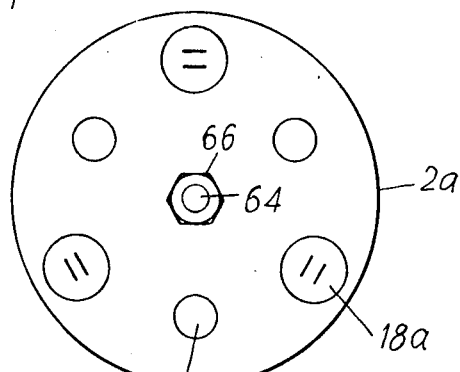

It is also possible to envisage other configurations and, of course, the chosen configuration will depend also on the required number and relative disposition of strain gauges. Thus, FIG. 4 illustrates in schematic outline one way in which a conventional rosette arrangement of strain gauges can be employed in apparatus according to the invention. The parts are generally similar to those already described with reference to FIGS. 1 and 2, comprising a circular housing 2a but there are now three equally spaced strain gauge carrier elements 18a, each with a pair of strain gauges, and the resilient pads 22a through which the denting pressure is applied are arranged equidistantly between the gauges. The apparatus in this modified form can still be secured by a single stud and nut.

Figure 5:
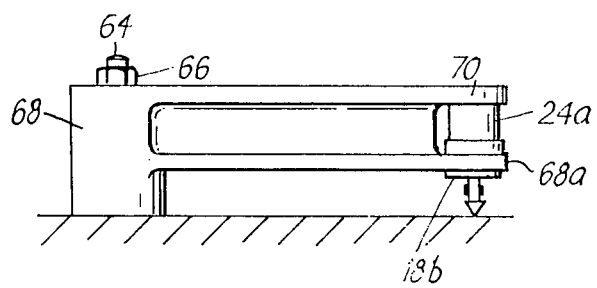

It would also be possible although not usual, to employ a single gauge, or a pair of gauges on a single carrier element, such as the carrier element 18b shown in FIG. 5 slidably supported in a close-fitting bore 68a on the free end of a cantilever-like rigid support member 68 that is secured by stud 64 and nut 66 to the structure at the other end. The resilient pad 24a transmits an engagement pressure to the carrier element from a bearer extension 70 of the support member and acts as a buffer limiting the surface engagement force on the carrier element produced when the nut 66 is tightened down.

What is claimed is:

1. Strain measurement apparatus for measurement of strain at the surface of a structure and comprising a substantially rigid support, means for securing the support to said surface at a first region thereof, at least one resiliently deformable carrier element bearing at least one strain gauge being mounted on said support, location means between said at least one carrier element and the support to permit displacement of the carrier element relative to the support in a direction transverse to the direction of strain measurement, resilient means acting on said at least one carrier element in said transverse direction to apply a force urging the or each carrier element into engagement with a respective further region of the surface spaced from said first region to be deformed by straining of the surface between said first and further regions thereby to generate signals in said at least one strain gauge responsive to said strain.

2. Apparatus according to claim 1 comprising a plurality of said deformable carrier elements on said support and wherein said securing means is disposed intermediate the respective regions of engagement of said carrier elements.

3. Apparatus according to claim 1 wherein said at least one carrier element comprises a pointed tip adapted to plastically deform the surface when engaged therewith to form its own seating in the surface, a location portion spaced from the tip and slidably engaging a location portion of the support to provide therewith said location means, and an intermediate portion between the tip and the carrier element location portion that is resiliently deformable and on which said at least one strain gauge is mounted.

4. Apparatus according to claim 1 further comprising means bearing against said resilient means for determining the pressure of engagement of said at least one carrier element with the surface, said bearing means being disposed in a predetermined position with respect to the support whereby the engagement pressure of said at least one carrier element with the surface is independent of the force applied to secure said support to the surface.

5. Apparatus according to claim 4 wherein said support securing means acts also on said bearing means for stressing said resilient means to engage said at least one carrier element with the surface.

6. Apparatus according to claim 5 comprising an enclosure shielding said at least one strain gauge or gauges and forming at least a part of the support for said at least one carrier element, said securing means securing said enclosure to the surface and also engaging said at least one carrier element with the surface.

7. Apparatus according to claim 1 comprising a protective enclosure for said at least one strain gauge, said at least one carrier element comprising a portion projecting from within the enclosure for said engagement with the surface, and sealing means on said enclosure co-operating with the surface to provide an outer enclosure for the projecting portion of said at least one carrier element.

8. Strain measurement apparatus for measurement of strain at the surface of a structure and comprising a substantially rigid support, means for securing the support to said surface at a first region thereof, a plurality of resiliently deformable carrier elements engaging respective further regions of the surface spaced from said first region and from each other, said first region being disposed centrally between said further regions, portions of the carrier elements being held by the support such that said portions are fixed in position in directions parallel to the plane of the surface whereby said carrier elements are resiliently deformed by straining of the surface between their respective regions of engagement, at least one strain gauge on each said carrier element thereby generating signals responsive to said strain, means for applying a surface engagement force to the carrier elements comprising bearer means, means for setting the distance of said bearer means from the surface whereby to generate said engagement force, and resilient means transmitting said engagement force to the carrier elements providing a buffer limiting the magnitude of the engagement force thereby applied through the carrier elements.

* * * * *